United States Patent [19]

Tuhkanen

[11] Patent Number: 4,848,715

[45] Date of Patent: Jul. 18, 1989

[54] SUSPENSION DEVICE FOR DOCUMENT STORING TUBE

[76] Inventor: Erkki T. Tuhkanen, Kaivokatu 15 B 25, 20520 Turku, Finland

[21] Appl. No.: 99,319

[22] PCT Filed: Jan. 14, 1987

[86] PCT No.: PCT/FI86/00005

§ 371 Date: Aug. 24, 1987

§ 102(e) Date: Aug. 24, 1987

[87] PCT Pub. No.: WO87/04382

PCT Pub. Date: Jul. 30, 1987

[30] Foreign Application Priority Data

Jan. 17, 1986 [FI] Finland ........................ 860215

[51] Int. Cl.[4] ........................ F16B 3/04

[52] U.S. Cl. ........................ 248/317; 248/225.1; 248/307; 248/312.1; 24/590

[58] Field of Search ........................ 248/317, 318, 312.1, 248/342, DIG. 14, 222.3, 225.1, 311.2, 303, 304, 322, 323, 348, 339, 307, 301; 211/73, 77, 74; 24/590; 206/151, 158, 149; 220/314, 124.4, 904

[56] References Cited

U.S. PATENT DOCUMENTS 1,575,270 3/1976 Jankowski ........................ 211/87
1,730,439 10/1929 Stephanian ........................ 211/74
1,761,218 6/1930 Lundy et al. ........................ 248/312.1
2,954,876 10/1960 Mathews ........................ 211/74
3,224,594 12/1965 Schweitzer ........................ 211/74
4,401,221 8/1983 Suttles ........................ 211/74 X
4,580,853 4/1986 Hitzeroth et al. ........................ 312/245
4,648,484 3/1987 Lovering ........................ 182/222
4,662,592 5/1987 Garfinkle ........................ 248/221.1
4,718,626 1/1988 Thalenfeld et al. ........................ 248/225.1

FOREIGN PATENT DOCUMENTS 61658 5/1982 Finland .

*Primary Examiner*—Ramon S. Britts
*Assistant Examiner*—Karen J. Chotkowski
*Attorney, Agent, or Firm*—Herbert Dubno

[57] ABSTRACT

Suspension device for document storing tube in a system, in which tubes are placed next vertical so that their intersection areas cover the suspension area as much as possible. The suspension device is composed of a plate strip (1) which on a lower edge has a couple of scores (2) with hooks (3), which make possible to suspend the tube on projections inside a usual cover, principally intended to facilitate extraction of the cover.

The lower edge of the plate strip (1) may compose several couples of scores (2) with hooks for suspending of tubes of various dimension and every score can form couple of scores with hooks (3) together with another score for suspending of at least two tubes of different dimension.

11 Claims, 1 Drawing Sheet

SUSPENSION DEVICE FOR DOCUMENT STORING TUBE

Often it is to store large documents rolled in a tube with closed ends. By this they are protected against damage and light. In the tube they may even be sent by post without special packing. For space savings, tubes may be placeable so, that their intersection areas cover the suspension area as much as possible. Tubes of different length may be suspended from same level but for more space saving, they can also be suspended in a third placing axle direction where it is possible to store tubes of various lengths at various levels.

FI patent No. 61 658 discloses a storing system for similar documents. The tubes are stored there in vertical position by means of two bearing pins fixed in a shoulder of selfbearing tubes. This system is unsatisfactory because the bearing pins must be fixed before it becomes possible to suspend the tubes.

The present invention overcomes problems with the aforementioned art.

Here is disclosed a suspension device for a document storing tube. The device is a flat rectangular plate strip comprising a plurality of scores each cut through a width of the plate. Each score is L-shaped including a leg and a hook portion. The leg is cut into a bottom edge of the plate and perpendicular to that bottom edge. The hook is perpendicular to the leg at an end distant from the edge of the plate. At least one of these scores has a leg portion parallel to a second of the scores and the respective hooks of these scores face one another. Normally there is also at least a third score identical to the first score but displaced a distance therefrom.

Preferably the plate also contains at least one pair of grooves symmetrically notched on a pair of opposite faces of the plate. These grooves start at an upper edge of the plate which is opposite the bottom edge. These grooves are preferably cut at an oblique angle into the plate relative to the score legs.

At either end of the rectangular plate there desirably is a partially circular incision cut through the width of the plate beginning at the bottom edge thereof.

The suspension device works in concert with a circular cover which is a lid for a document storing tube. A rim along a top circumference of the cover has formed thereinto at least one pair of lip projections directed inwardly relative to the circumference. Each of the pair of lip projections faces one another.

One or more document storing tubes may then be vertically hung between the rods by attachment to the plate through a circular cover which serves as a lid for the document storing tube.

Each pair of grooves can be utilized to support a label tag with corresponding incision. The label is fitted into the groove.

The invention is described in more detail with reference to the drawing wherein.

Figure 1:
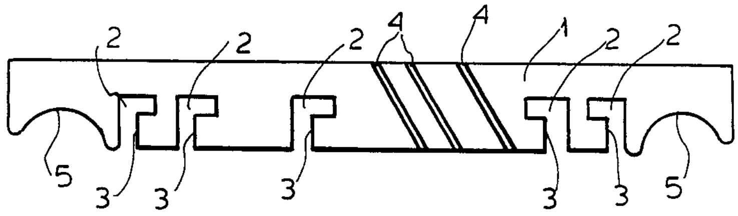
FIG. 1 is a perspective view of the suspension device.
Figure 2:
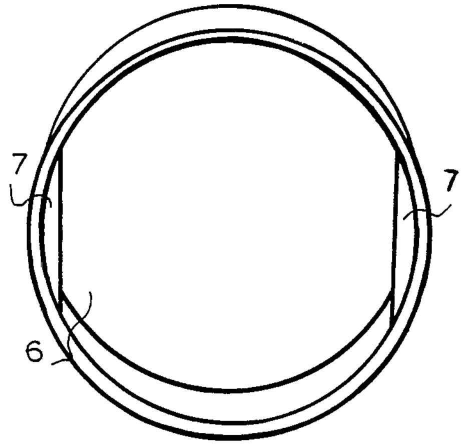
FIG. 2 is a top view of a cover for the storing tube.
Figure 3:
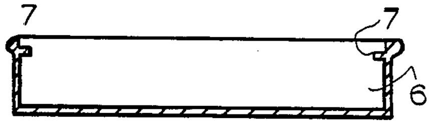
FIG. 3 is the cover of the tube shown by FIG. 2 in cross-section.

The suspension of the tube 6 on the suspension device is made by means of projections 7 on the inside of the usual cover of plastic material, which projections normally are made on the cover to facilitate removal of the same. Therefore it is not necessary to do anything on the tube or on its cover to perform the suspension. Of course, for security purposes the cover can also be fixed onto the tube in any of several known ways.

The suspension device comprises a plate strip 1 having a lower edge several L-shaped coupled scores 2 with hook 3 dimensioned for various kinds of tubes.

The upper edge of the plate strip can be formed with grooves 4 without hooks for fixing an address-label or labels.

The lower edge of the plate strip can be formed with incisions 5 at the ends for placing the plate strip in a frame work. Of course, suspension can also be accomplished without the rods or incisions in a variety of self-evident ways.

I claim:

1. A suspension device for a document storing tube, the device being a flat rectangular plate strip comprising a plurality of scores each cut through a width of said plate, each score consisting of an L-shaped profile including a leg and a hook portion, the leg being cut into a bottom edge of said plate and perpendicular to said bottom edge, the hook being perpendicular to said leg at an end distant from said bottom edge, the plate having at least one pair of grooves symmetrically notched on a pair of opposite faces of said plate, said grooves being at an upper edge of said plate opposite said bottom edge and running in an oblique direction relative to said upper edge.

2. A device according to claim 1 wherein at least one first of said scores has a leg portion parallel to a second of said scores and the respective hooks facing in a dirction toward one another.

3. A device according to claim 2 further comprising a third score identical to said first score but displaced a distance therefrom.

4. A device according to claim 1 further comprising a plurality of partially circular incisions cut through said width of said plate at said bottom edge.

5. A suspension system for a document storing tube comprising:

a flat rectangular plate strip comprising a plurality of scores each cut through a width of the plate; and a circular cover which is a lid for the document storing tube, said cover having a rim along a top circumference of said cover and at least one pair of lip projections directed inward of the circumference with each of said pair of lip projections facing one another, said lip projections being discontinuous around said circumference, and wherein said lip projections engage said scores of said plate.

6. A system according to claim 5 wherein at least one first of said scores has a leg portion parallel to that of a second of said scores.

7. A suspension system according to claim 6 further comprising a third score identical to said first score but displaced a distance therefrom.

8. A suspension system according to claim 5 wherein said plate has at least one pair of grooves symmetrically notched on a pair of opposite faces of said plate, said grooves being at an upper edge of said plate opposite said bottom edge.

9. A suspension system according to claim 8 wherein said grooves run in an oblique direction relative to said upper edge.

10. A suspension system according to claim 5 further comprising a plurality of partially circular incisions cut through said width of said plate at said bottom edge.

11. A system according to claim 5 wherein each of said plurality of scores consists of an L-shaped profile including a leg and a hook portion, the leg being cut into a bottom edge of said plate and perpendicular to said bottom edge, the hook being perpendicular to said leg at an end distant from said bottom edge.

* * * * *